United States Patent [19]
Crisler et al.

[11] Patent Number: 5,278,833
[45] Date of Patent: Jan. 11, 1994

[54] METHOD FOR PROVIDING RESERVED COMMUNICATION ACCESS USING MULTIPLE RANDOM ACCESS RESOURCES

[75] Inventors: Kenneth J. Crisler, Wheaton; Michael L. Needham, Palatine, both of Ill.

[73] Assignee: Motorola, Inc., Schaumburg, Ill.

[21] Appl. No.: 676,923

[22] Filed: Mar. 28, 1991

[51] Int. Cl.$^5$ .............................................. H04J 3/16
[52] U.S. Cl. .................................. 370/95.1; 370/95.3
[58] Field of Search ................... 370/85.2, 87.7, 104.1, 370/85.1, 94.1, 95.1, 95.3

[56] References Cited

U.S. PATENT DOCUMENTS

| | | | |
|---|---|---|---|
| 4,107,608 | 9/1978 | Suburi | 370/95.3 |
| 4,472,802 | 9/1984 | Pin et al. | 370/95.3 |
| 4,480,328 | 10/1984 | Alaria et al. | 370/95.3 |
| 4,504,946 | 3/1985 | Raychaudhuri | 370/95.3 |
| 4,612,637 | 9/1986 | Davis et al. | 370/95.3 |
| 4,641,304 | 2/1987 | Raychaudhuri | 370/95.3 |
| 4,754,453 | 6/1988 | Eizenhofer | 370/95.1 |
| 4,763,322 | 8/1988 | Eizenhofer | 370/95.1 |
| 4,764,920 | 8/1988 | Furuya | 370/95.1 |
| 5,012,469 | 4/1991 | Sardana | 370/95.1 |
| 5,103,445 | 4/1992 | Ostlund | 370/95.2 |
| 5,142,533 | 8/1992 | Crisler et al. | 370/95.1 |

OTHER PUBLICATIONS

W. Stalling "Data and Computer Communications" 1985 pp. 312–319
"Packet Reservation Multiple Access For Local Wireless Communications", Goodman et al., IEEE Publication, pp. 701–706 (Jun., 1988).
Multiple Access Protocols for Data Communications via VSAT Networks, Wolejsza et al., IEEE Communications Magazine, pp. 30–39 (Jul., 1987).
Performance Analysis of Virtual Time CSMA, Meditch et al., IEEE Publication, pp. 242–251 (Apr., 1986).
Virtual Time CSMA: Why Two Clocks are Better Than One, Molle et al., IEEE Transactions on Communications, pp. 919–933 (Sep., 1985).
Multiaccess Protocols in Packet Communication Systems, Tobagi, IEEE Transactions on Communications, pp. 468–488 (Apr., 1980).

Primary Examiner—Douglas W. Olms
Assistant Examiner—Ajit Patel
Attorney, Agent, or Firm—Steven G. Parmelee

[57] ABSTRACT

A communication resource is subdivided as a function of time into a plurality of time slots (210). These time slots are further subdivided on a non-periodic basis into a least two random access sub-slots (220), during which communication units (101) may request one or more reserved time slots (240). In response to such requests for reserved time slots from a requesting communication unit during one of the random access sub-slots, one or more reserved time slots are provided for use by the requesting communication unit.

14 Claims, 4 Drawing Sheets

5,278,833

METHOD FOR PROVIDING RESERVED COMMUNICATION ACCESS USING MULTIPLE RANDOM ACCESS RESOURCES

FIELD OF THE INVENTION

This invention relates generally to communication systems, including but not limited to methodologies that control access to communication resources by a plurality of competing communication units.

BACKGROUND OF THE INVENTION

Multiple access communication systems are well understood in the art. Multiple access communication systems are designed to provide access to limited communication resources by a plurality of communication units for the purpose of transmitting communication messages, referred to here as packets. The access methodology, referred to as a multiple access protocol, is chosen such that some appropriate set of performance constraints are met. Typical performance constraints include efficiency of communication resource use, communication message delay, and other similar factors. Multiple access protocols can be regarded as belonging to one of two general types, contention and non-contention.

Non-contention protocols are designed such that a communication unit has exclusive use of a communication resource. Time-division multiple access (TDMA) constitutes one such example where the communication resource is divided into a plurality of time frames and then further subdivided into a plurality of time slots, and each communication unit is assigned exclusive use of one or more time slots in each time frame. This type of protocol is inefficient for communication units with substantially infrequent messages since the assigned time slot remains substantially unused in between messages. The practical number of communication units that can be accommodated by such a protocol is also limited by the delay incurred while waiting for the assigned slot, which delay increases proportionally to the total number of communication units having assigned slots.

Contention protocols, such as slotted ALOHA, are characterized by communication units that actively compete with each other to gain access to the communication resource. In slotted ALOHA, a communication resource is divided into a plurality of time slots. A communication unit desiring to send a packet will transmit in a first subsequent time slot, taking care not to transmit outside of the boundaries of that time slot, and then monitor for a collision. If no other communication unit also transmitted in that time slot, the packet transmission is considered successful. (Other factors, such as communication channel noise, may ultimately result in failure of the message, but these other factors are not related to the access protocol.) If one or more other communication units transmitted a packet in the same time slot, generally all transmissions would fail due to collision. Thus contention protocols generally work well for lightly loaded systems, but performance suffers as load increases because the likelihood of collisions also increases. Further, communication messages longer than the time slot duration must be sent in separate time slots and are subject to collision in each time slot used.

Reservation protocols, a sub-class of contention protocols, are known. Reservation protocols attempt to combine certain aspects of contention and non-contention protocols to provide improved performance for a wider variety of communication system conditions. A typical reservation protocol divides a communication resource into a series of fixed-size time frames. These frames are then further divided into a series of time slots. The time slots are comprised of two types, a reservation time slot and a data time slot, with equal numbers of each in each time frame. The reservation time slots are generally smaller than the data time slots and are grouped together at the beginning of each time frame. A communication unit desiring access to the communication resource transmits randomly in one of the reservation time slots. If it successfully avoids contention and is therefore the only unit to transmit in a given reservation time slot, it obtains exclusive access to the associated data time slot occuring later in the time frame.

In one particular reservation protocol (Reservation-ALOHA (R-ALOHA)) when the communication resource is unused, the protocol operates similarly to slotted ALOHA. When a communication unit desires to send a packet, it transmits in one of the unused time slots, referred to as a random access slot. If the transmission is successful, i.e. it does not collide with another transmission, the communication unit is permitted exclusive use of the same time slot in subsequent time frames, referred to as reserved access slots, until the packet is completely transmitted. Thus the initial ALOHA transmission results in a subsequent reservation of a communication resource. Some method of feedback to the communication units regarding the success or failure of initial ALOHA transmissions is necessary in order for this protocol to be effective.

R-ALOHA efficiently accommodates a wide variety of packet frequencies and sizes. Some limitations can be noted, however. The ultimate efficiency of the protocol is governed by the size of the random access portion of a packet relative to the complete packet since only this portion is subject to contention failure. In R-ALOHA, this size is equivalent to a time slot. There are many competing factors that contribute to the determination of time slot duration in the design of a communication system. The result may not contribute to optimum performance. For example, longer time slots increase transmission efficiency because requiste overhead requirements are reduced, but a longer time slot decreases the effectiveness of R-ALOHA. Also, due to the contention for unused time slots in R-ALOHA, several unused slots may need to pass before a successful random access is accomplished. These unused slots represent wasted communication capacity.

Accordingly, a need exists for a multiple access method that provides increased utilization of a communication resource by a plurality of communication units having widely varying communication requirements.

SUMMARY OF THE INVENTION

A method of providing a communication unit access to a reserved communication resources is disclosed herein. The communication resource is subdivided as a function of time into a plurality of time slots. These time slots are further subdivided on a non-periodic basis into a least two random access sub-slots, during which sub-slots the communication units may request one or more reserved time slots. In response to such requests, one or more reserved time slots are provided for use by the requesting communication unit.

DESCRIPTION OF A PREFERRED EMBODIMENT

Figure 1:
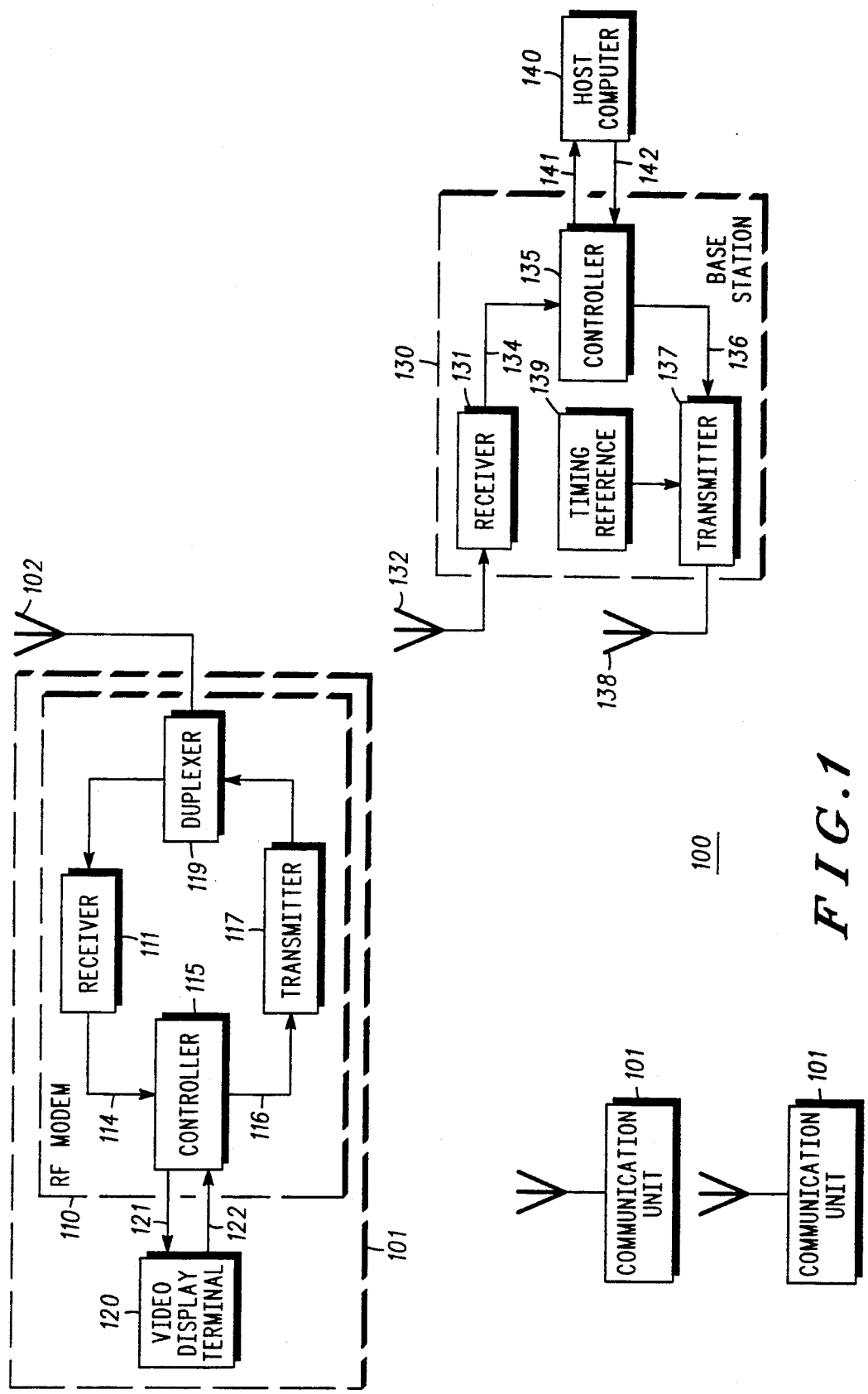
FIG. 1 comprises a block diagram of a communication system configured in accordance with the present invention.

Referring to FIG. 1, a block diagram of a communication system can be seen as generally depicted by the numeral 100. The communication system (100) provides for radio frequency communications between a plurality of communication units (101) and a base station (130). The base station (130) is further connected to a host computer (1400 to which communication messages from the communication units (1010 are delivered and from which communication messages directed to the communication units (101) are accepted. A communication unit (101) is comprised, in this embodiment, of a video display terminal (120) and an RF modem (110). The user of the communication unit (101) interacts with the video display terminal (120) in a well known prior art manner to exchange data messages with the host computer (140). The RF modem (110) operates to appropriately process the communication messages for exchange with the base station (130). (The communication units (101) are substantially mobile and communicate with the base station (130) via a radio frequency (RF) communication channel. Those skilled in the art should appreciate that the present invention may be applied to any communication system where a plurality of communication units share a common communication channel, for example a local area network (LAN).)

The communication messages within the communication system (100) comprise inbound and outbound information and control packets, which are communicated on an RF communication channel. The information contained in the communication packets may comprise any appropriately formatted data. In this particular embodiment, the RF communication channel comprises a pair of radio spectrum bands, appropriately separated in frequency, such that one band is utilized for inbound communications and the other band is utilized for outbound communications. The RF communication channel is also divided using Time Division Multiplexing (TDM) into a plurality of time slots during which information packets are exchanged. Importantly, and as described below in more detail, when the inbound communication channel is not currently in use for transmitting an information packet, the time slots on the inbound channel are further subdivided into at least two subslots. Control packets may be transmitted during these subslots for the purpose of securing reservations for exclusive use of subsequent inbound time slots.

Outbound communication packets (i.e., those originating at the host computer (140) and directed to the communication units (101)) are suitably formatted for RF transmission at the base station (130) and transmitted to the communication units (101) via the outbound RF communication channel. Since packets traversing this communication path have only one source, the packets are transmitted by the base station (130) without contention.

On the other hand, the communication units (101) compete for the opportunity to transmit communication packets to the host computer (140) on the inbound RF communication channel. As will be described later, according to the present invention the RF modem (110) and the base station (130) operate to provide orderly and efficient use of the shared communication channel by the communication units (101).

The RF modem (110) is shown to include an RF receiver (111) that couples to an appropriate antenna (102) via a duplexer (119) to receive RF communication signals and provide a received signal (114). The received signal (114) is applied to a controller (115). The controller (115) operates on the received signal (114) in a known manner to separate the user and control data portions of the received signal (114). The user data signal (121) is applied to the video display terminal (120), which processes the user data signal for display to the user. The transmit user data (122) from the video display terminal (120) is applied to the controller (115). The controller (115) operates in a manner to be described later to control transmission of the user data (122) according to the information contained in the control data portion of the received signal (114) previously applied to the controller (115). Accordingly, the controller (115) appropriately formats the transmit user data (122) and adds appropriate control data to provide a transmit signal (116). The transmit signal (116) is applied to a well known RF transmitter (117) which appropriately modulates and amplifies the transmit signal (116) for transmission by the antenna (102) via the duplexer (119).

The base station (130) is shown to include an RF receiver (131) that couples to an appropriate receive antenna (132) to receive RF communication signals and provide a received signal (134) to a controller (135). The controller (135) operates on the received signal (134) in a known manner to separate the user and control data portions of the received signal (134). As will be described later, the control data portion of the received signal (134) is processed by the controller to provide a return control data signal for transmission to the RF modem (110). The user data signal (141) is applied to the host computer (140). A transmit user data signal (142) from the host computer (140) is applied to the controller (135). The controller (135) combines appropriate transmit control data with the transmit user data (142) to form a transmit signal (136) that is applied to an RF transmitter (137). The transmitter (137), being synchronized by a timing reference (139), appropriately modulates and amplifies the transmit signal (136) for transmission by an appropriate transmit antenna (138).

Figure 2:
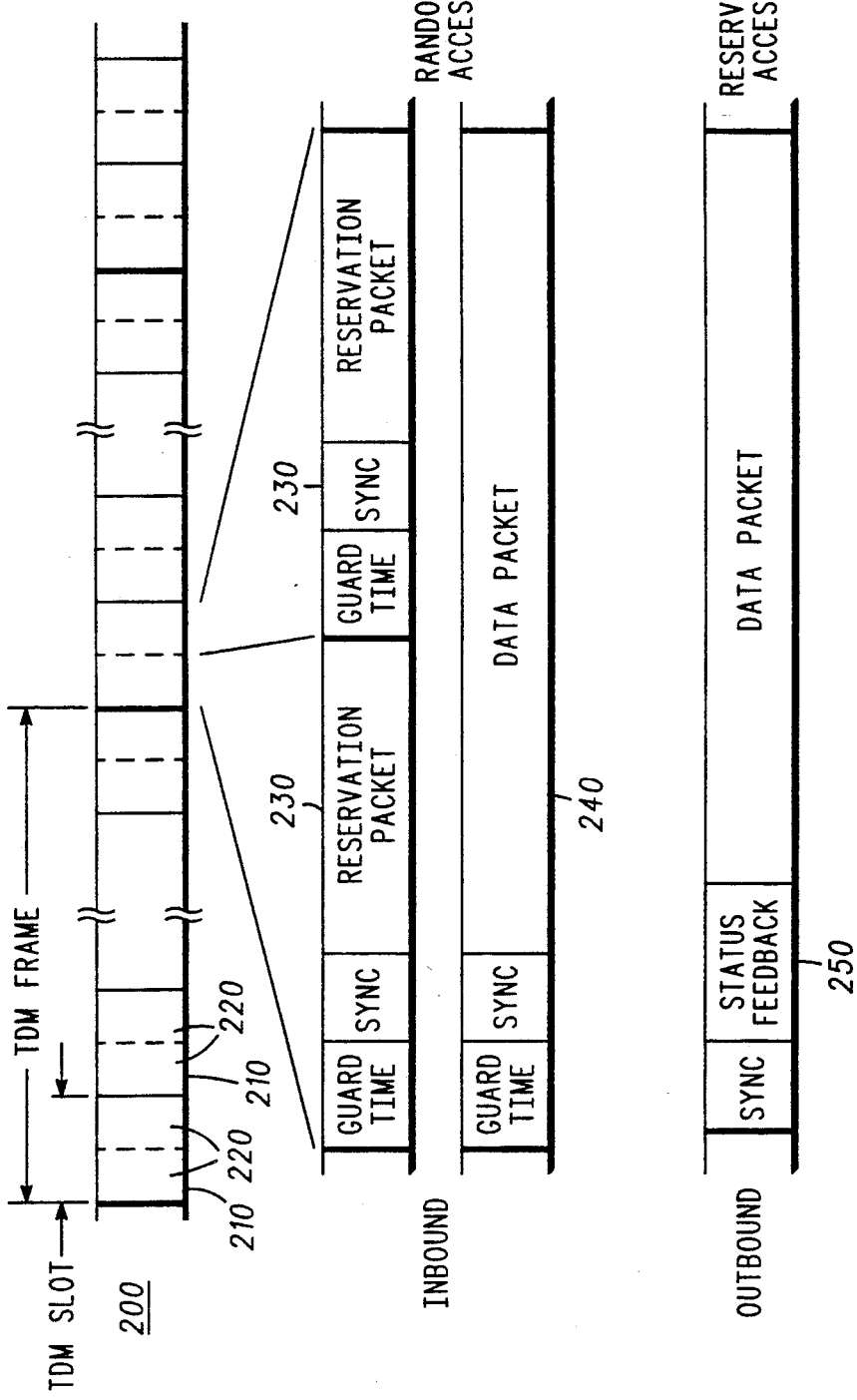
FIGS. 2A-C depict channel formats in accordance with the present invention.

Referring to FIG. 2a, the communication channel format (200) is shown. The channel, including both the receive and transmit frequencies, is generally divided into repetitive time frames (205) that are further divided into a plurality of time slots (210). The time slots (210) are used for transmission of inbound and outbound data packets. When no inbound user data packet is currently being transmitted in an inbound time slot, that time slot comprising a portion of the inbound channel is further subdivided into a plurality of subslots (220). In the preferred embodiment, the number of subslots is two, but of course other values could be chosen to suit the needs of a particular application. These subslots (220) are used by communication units (101) to transmit random access control packets for the purpose of reserving a subsequent time slot (210) in which to transmit a data packet, as described below in more detail.

FIG. 2B shows exemplary time slot formats for the inbound communication channel. When the channel is available for random access, the inbound time slot is subdivided into two random access subslots (230). The random access subslots include a GUARD TIME field to avoid interference between adjacent time slots. The SYNC field provides information to enable proper slot and bit timing to be recovered at the RF receiver. The RESERVATION PACKET field comprises a control message that indicates to the receiving base station (130) that an RF modem (110) has a data packet to send. An RF modem desiring to transmit a data packet may transmit a reservation packet in either of the two random access subslots (230). The reservation packet contains at least an identifier and a data packet length. The identifier permits the base station to determine which communication unit (101) is requesting channel access. The data packet length relates to the size of the packet that the RF modem desires to send. The base station may use this information to determine how many time slots are required for transmission of the packet. When a valid RESERVATION PACKET is received at the base station (130), the time slot (210) configuration switches from random access to reserved access. Under reserved access, the time slot format is as depicted by the numeral 240. The GUARD TIME and SYNC fields achieve the same purpose as that described in association with the random access subslots. The DATA PACKET field comprises the user data information to be delivered to the host computer (140). The size of the user data information may dictate that several reserved access time slots (240) are required to completely transmit the packet. To accommodate messages requiring more than one reserved access time slot, one or more time slots may be reserved in multiple frames. Accordingly, the reserved time slots maintain the reserved access configuration (240) until the transmission of the data packet is complete, after which the time slots revert to the random access format. Whenever a time slot is designated for reserved access, only the single communication unit (101) for whom the time slot was reserved is permitted to transmit packets in that time slot.

Referring to FIG. 2C, the outbound time slot format (250) is shown. The format comprises SYNC information, STATUS FEEDBACK information, and a DATA PACKET. The SYNC achieves the same purpose as that described in association with the inbound channel configurations. The DATA PACKET comprises under data information received at the base station (130) from the host computer (140) to be delivered to the communication units (101). The STATUS FEEDBACK information comprises information which enables the operation of the inbound channel access protocol. The STATUS FEEDBACK information is determined by the base station controller (135) and includes the current state of at least one of the inbound time slots, either random access or reserved access. If the channel state is reserved, the STATUS FEEDBACK further includes a communication unit identifier that permits communication units (101) to uniquely determine which communication unit (101) is provided with the time slot reservation.

Since the random access configuration of the inbound communication channel shown in FIG. 2B comprises two random access subslots, it is possible for two communication units (101) to transmit reservation packets in the same time slot. As described above, under this circumstance, the base station controller (135) may simply choose one of the two requesting units to receive subsequent reserved access. The unit not chosen would then be required to send a new reservation request in a subsequent random access time slot.

In an alternate embodiment, the base station controller (135), having received multiple reservation requests, may choose one for the initial reservation on the time slot and place the other requests in a queue. The state of the reservation queue may also be indicated to the communication units via the status feedback contained in the outbound time slots. Upon the expiration of the initial reservation, the base station controller (135) would then provide the reserved access to the time slot to the next request in the queue. This process would continue until the reservation queue was empty, at which time the time slot would resume random access to accept new reservation request packets. In this way, a communication unit (101) having successfully submitted a reservation request to the base station (130) will receive reserved access to the communication channel before new reservation requests are accepted.

Figure 3:
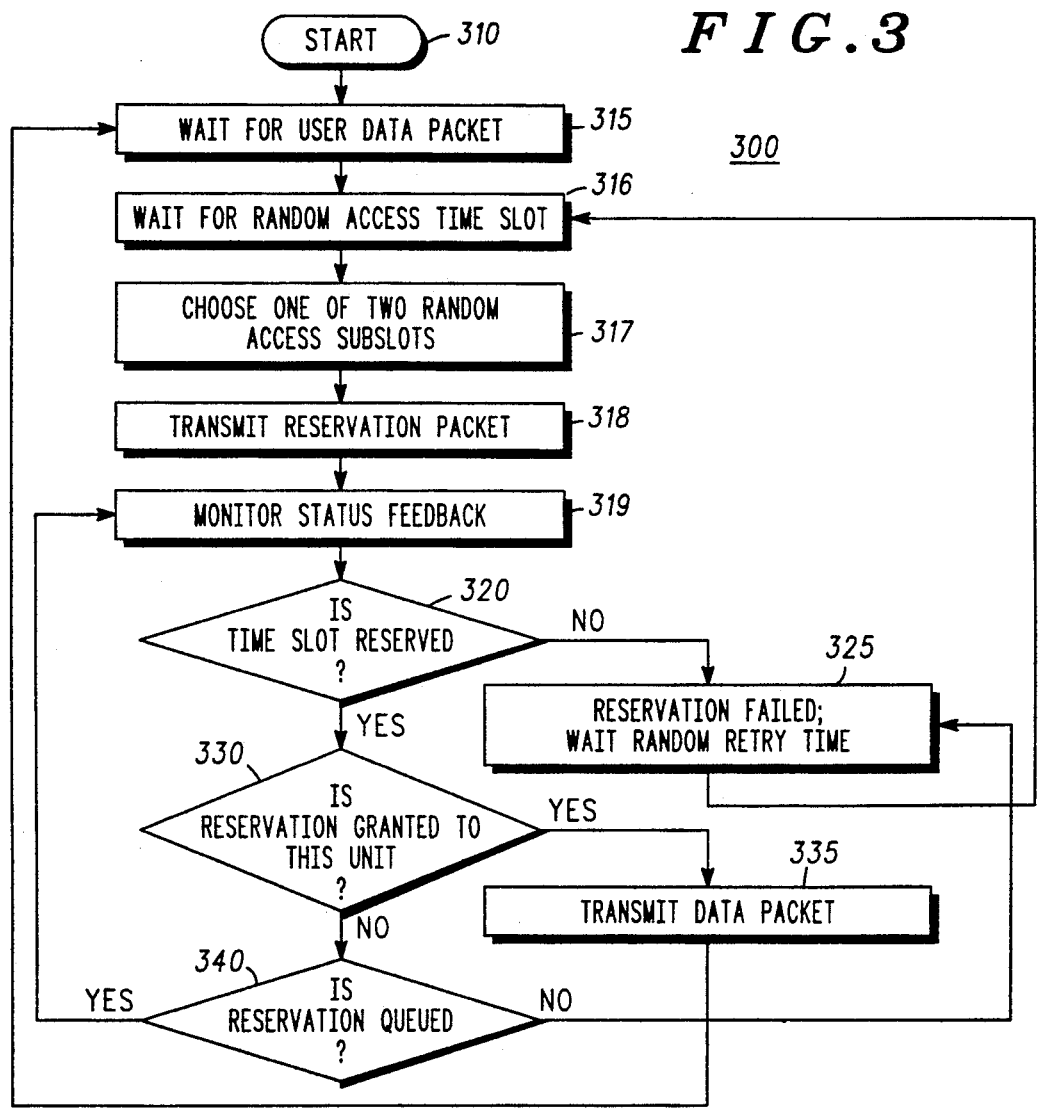
FIG. 3 is an operation flow chart of the RF modem of FIG. 1 in accordance with the present invention.

Referring to FIG. 3, the operation (300) of the communication unit controller (115) will be described. The controller begins by waiting (315) for user data to be received from the connected video display terminal (120). Upon receiving the data packet, the controller waits (316) for the occurrence of a random access time slot on the inbound communication channel. When a random access time slot is found, the controller chooses (317) one of the two random access subslots in which to transmit a reservation packet, and then transmits (318). The controller then begins to monitor the status feedback on the outbound communication channel (319).

First it is determined if the time slot is now reserved (320). If not, the reservation attempt has failed, and after waiting an appropriate length of time (325), the controller returns (316) to resend the reservation packet. If the time slot is reserved, however, the reservation identifier portion of the status feedback is examined to determine if the reservation has been granted to this communication unit (330). If the time slot is reserved for this unit, the user data packet may then be transmitted in the reserved time slot (335). If the reservation is not for this unit, the status feedback is examined (in the preferred embodiment) (340) to determine if this unit's request may be in a reservation queue. If the reservation is queued, the controller resumes monitoring status feedback (319), in anticipation of a future reservation. If the reservation is not queued, the reservation attempt has failed and the controller proceeds to attempt a new reservation (325).

Figure 4:
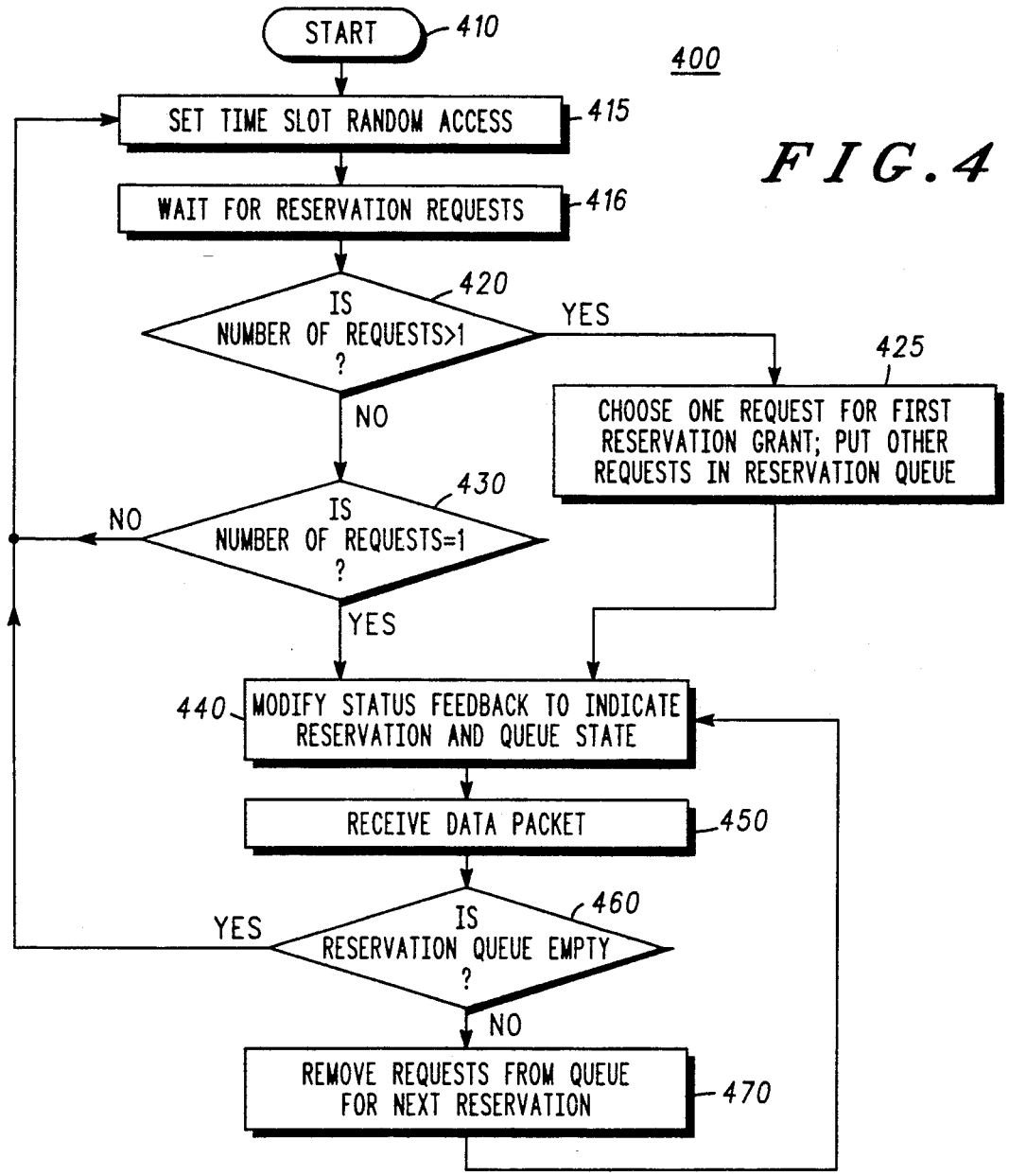
FIG. 4 is an operation flow chart of the base station of FIG. 1 in accordance with the present invention.

Referring to FIG. 4, the operation (400) of the base station controller (135) will be described. The controller begins by configuring the inbound time slot for random access(415). The controller then waits (416) to receive reservation requests from the communication units (101). A received number of reservation requests are then examined (420 and 430). If more than one reservation request was received, the controller chooses one of the reservation requests for immediate granting of reserved access, and in the preferred embodiment, places the other request in a reservation queue (425). If only one request was received, the requesting unit is provided with the reservation and the reservation queue remains empty. If no requests were received, the controller returns (415) to monitor for future requests. Current status feedback is formatted (440) to indicate the new reservation and the state of the reservation queue.

The status feedback is transmitted on the outbound communication channel enabling the communication unit (101) to transmit the data packet which is then received by the base station (450). After the data packet is completely received, the controller examines the state of the reservation queue (460). If the queue contains a waiting reservation request, the request is removed from the queue (470). The controller then services (440) the new reservation and data packet. If the examined queue (460) is empty, no more reservations are currently required. The controller then returns (415) to where the time slot is restored to random access to enable new reservation requests to be received.

Accordingly, the present invention operates to provide orderly and efficient access to a shared TDM communication channel by a plurality of communication units (101). The communication units (101) must request exclusive access to reserved time slots via the transmission of reservation requests in random access subslots. The random access subslots are provided by subdivision of time slots on the communication channel which are not currently being used to transmit user messages. Therefore, the random access subslots are provided in a non-periodic basis, though with a frequency related to current loading of the system.

What is claimed is:

1. A method of providing reserved communication resources, comprising the steps of:
   A) subdividing a communication resource as a function, at least in part, of time, to provide a plurality of time slots;
   B) on a non-periodic basis, subdividing at least one of the plurality of time slots into at least two random access sub-slots, during which random access sub-slots communication units can request a reserved time slot;
   C) upon receiving a request for at least one reserved time slot from a requesting communication unit during one of the random access sub-slots, providing at least one reserved time slot for use by the requesting communication unit.

2. The method of claim 1, wherein step C includes the steps of:
   C1) upon receiving a request for at least one reserved time slot from more than one requesting communication unit, providing at least one reserved time slot for use by a first requesting communication unit.

3. The method of claim 2, wherein step C further includes the steps of:
   C2) queueing at least a second requesting communication unit, other than the first requesting communication unit, for subsequent provision of at least one reserved time slot.

4. A method of receiving a data packet, comprising the steps of:
   A) subdividing a communication resource as a function, at least in part, of time, to provide a plurality of time slots;
   B) on a non-periodic basis, subdividing at least one of the plurality of time slots into at least two random access sub-slots, during which said random access sub-slots, communication units can request a reserved time slot;
   C) upon receiving a request for at least one reserved time slot from a requesting communication unit during one of the random access sub-slots, providing at least one reserved time slot for use by the requesting communication unit;
   D) receiving said data packet during said at least one reserved time slot from said requesting communication unit.

5. The method of claim 4, wherein step C includes the steps of:
   C1) upon receiving a request for at least one reserved time slot from more than one requesting communication unit, providing at least one reserved time slot for use by a first requesting communication unit.

6. The method of claim 5, wherein step C further includes the steps of:
   C2) queueing at least a second requesting communication unit, other than the first requesting communication unit, for subsequent provision of at least one reserved time slot.

7. A method of transmitting a data packet, comprising the steps of:
   A) determining whether a communication resource is available for random access;
   B) upon determining that the communication resource is available for random access, choosing one of a plurality of random access subslots;
   C) transmitting a request for at least one reserved time slot in the chosen random access subslot;
   D) determining whether the reserved time slot has been assigned to support transmission of the data packet;
   E) upon determining that the reserved time slot has been assigned to support transmission of the data packet, transmitting at least part of the data packet in the reserved time slot;
   F) upon determining that the reserved time slot has not been assigned to support transmission of the data packet, repeating from step A.

8. The method of claim 7, and further including the step of:
   F) upon determining that the reserved time slot has not been assigned to support transmission of the data packet, determining whether the request has been queued.

9. The method of claim 8, and further including the step of:
   G) when the request has not been queued, repeating from step A.

10. The method of claim 9, and further including the step of:
    H) when the request has been queued, monitor the communication to determine when the reserved time slot has been assigned to support transmission of the data packet.

11. A method of allocating radio frequency communication resources, comprising the steps of:
    A) providing at least one radio frequency channel;
    B) on a periodic basis, subdividing the radio frequency channel as a function of time into a plurality of time division multiplexed frames;
    C) subdividing the time division multiplexed frames into a plurality of time division multiplexed time slots;
    D) subdividing at least some of any of the time division multiplexed time slots that are not being currently used for reserved communication purposes into at least two random access sub-slots;

E) monitoring the random access sub-slots;

F) upon receiving a request for at least one reserved time slot from a requesting radio communication unit during one of the random access sub-slots, providing at least one reserved time slot for use by the requesting radio communication unit;

G) from time to time, using at least some of the subdivided time slots as reserved time slots by not subdividing the time slots into sub-slots.

12. The method of claim 11, wherein each time slot, and each sub-slot, includes a synchronization field.

13. The method of claim 11, wherein:

A) the at least one radio frequency channel is used for inbound messages from radio communication units.

14. The method of claim 13, and further comprising the step of:

H) providing at least one other radio frequency channel for outbound messages to radio communication units, which at least one other radio frequency channel is also subdivided into time division multiplexed frames and time slots, but not sub-slots.

* * * * *